United States Patent [19]

Harada et al.

[11] Patent Number: 4,702,585

[45] Date of Patent: Oct. 27, 1987

[54] ANALOG-TO-DIGITAL CONVERTER FOR CAMERA

[75] Inventors: Yoshihito Harada; Masayoshi Kiuchi; Ryuichi Kobayashi; Masaharu Kawamura, all of Kanagawa, Japan

[73] Assignee: Canon Kabushiki Kaisha, Tokyo, Japan

[21] Appl. No.: 939,864

[22] Filed: Dec. 9, 1986

[30] Foreign Application Priority Data

Dec. 13, 1985 [JP] Japan .................. 60-281635

[51] Int. Cl.⁴ ............................................ C03B 7/091
[52] U.S. Cl. .................................. 354/410; 354/441
[58] Field of Search ............... 354/410, 412, 426, 437, 354/441, 442, 443, 458, 451

[56] References Cited

U.S. PATENT DOCUMENTS

| | | | |
|---|---|---|---|
| 4,363,540 | 12/1982 | Takishima et al. | 354/451 |
| 4,370,037 | 1/1983 | Uchidoi et al. | 354/412 |
| 4,401,373 | 8/1983 | Nakai | 354/412 |
| 4,453,811 | 6/1984 | Yamasaki | 354/412 |

Primary Examiner—W. B. Perkey
Attorney, Agent, or Firm—Fitzpatrick, Cella, Harper & Scinto

[57] ABSTRACT

There is disclosed an analog-to-digital converter for a camera which is arranged to convert an analog signal of an exposure information, particularly a photometric output of a light measuring circuit into a corresponding digital signal. The analog-to-digital converter according to the present invention includes means for dividing a photometric output signal of a light measuring circuit, which is fed into an analog-to-digital converting circuit, into predetermined areas, means for level-shifting the respective ones of the divided areas of said photometric output signal, and means for feeding the level-shifted photometric output in the respective areas, separately, into the analog-to-digital converter circuit, whereby digital values are obtained, separately, in connection with the respective ones of the divided areas of the photometric output signal.

7 Claims, 9 Drawing Figures

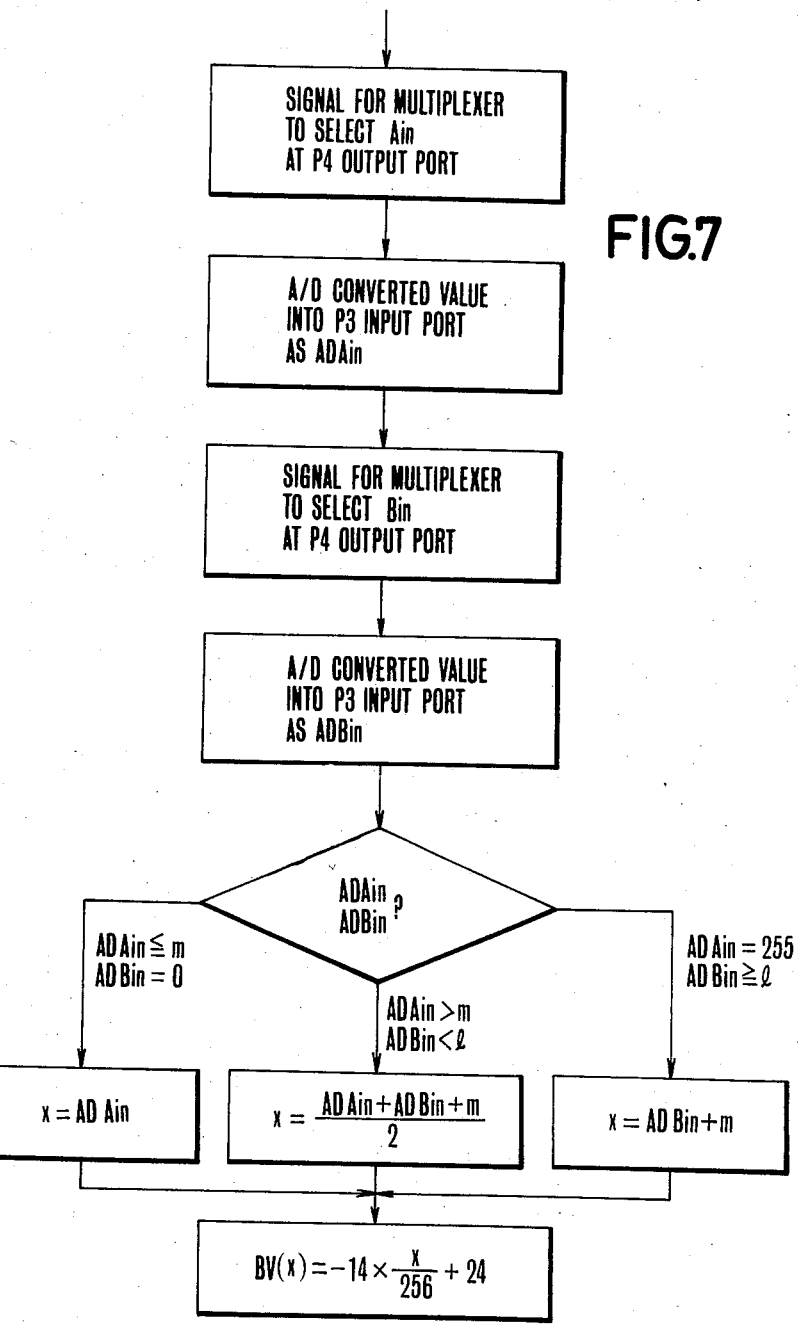
FIG.7
FIG.8
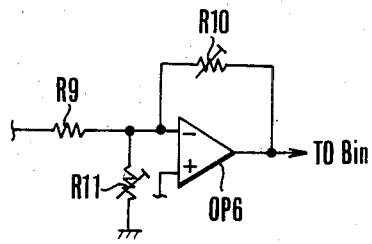

4,702,585

ANALOG-TO-DIGITAL CONVERTER FOR CAMERA

BACKGROUND OF THE INVENTION

1. Field of the Invention

The present invention relates to an analog-to-digital converter for a camera and, particularly, it relates to an analog-to-digital converter (hereinafter referred to as A-D converter) for effecting analog-to-digital conversion (hereinafter referred to as A-D conversion) of a photometric output of a light measuring device of a camera, thereby obtaining a photometric value in the form of a digital signal.

2. Description of the Related Art

Recently, a digital exposure control has become widely used in a camera and, accordingly, a light measuring device of the type in which an analog signal of a photometric output of the light measuring device is converted into a corresponding digital signal by means of an A-D converter whereby a photometric value is obtained in the form of a digital value is frequently used in a camera.

Such an A-D converter is disclosed, for example, in U.S. Pat. Nos. 4,265,521, 4,167,312, 4,162,839, 4,462,673, 4,363,540, 4,370,037, 4,480,902, 4,455,069 and 4,103,307.

In order to reduce a time required to effect the A-D conversion, the A-D converter circuit used in the light measuring device is preferably constructed in the form of a sequential comparison type in which a relatively short time is required to effect the A-D conversion.

The A-D converter of this type, however, includes a resistor array, as its indispensable component, and, consequently, an error in reading a voltage in the order of a few LSB is necessarily caused owing to such factors as irregularities of resistor elements or the like.

For example, the A-D converter circuit of 8-bit type, in which its full range is from 0(V) to Vfull (V), has a resolving power of Vfull/256, and if it is assumed that there is an error of nLSB, the voltage reading error of n×Vfull/256 is caused. In this instance, nLSB is a characteristic value of the circuit and, therefore, the nLSB indicates a characteristic error. In order to reduce such error, it is required to reduce the full range.

SUMMARY OF THE INVENTION

It is an object of the present invention to provide a light measuring device in which a photometric output is divided into a plurality of areas, depending upon a quantity of light thereof so that a full range of the photometric output in each of these areas is reduced as compared with a full range of the photometric output over the whole area, thereby reducing the above-mentioned voltage reading error.

It is another object of the present invention to provide a light measuring device which includes means for level-shifting a photometric output by a predetermined amount, an A-D converter for converting an analog signal of the photometric output before level-shifting and an analog signal of the photometric output after level-shifting into corresponding digital signals, respectively, and means for obtaining digital values corresponding to the photometric output on the basis of the converted digital signals.

With the objects as mentioned above, the present invention provides an A-D converter for a camera for converting an analog signal of an exposure information forming circuit into a corresponding digital signal, which comprises level-shifting means arranged to obtain a signal which is level-shifted by a predetermined amount relatively to the analog signal of the exposure information signal; an A-D converting circuit arranged to convert the analog signals of the photometric output before and after the level-shifting into corresponding digital signals, respectively, thereby obtaining a first digital signal corresponding to the photometric output before the level-shifting and a second digital signal corresponding to the photometric output after the level-shifting and a processing unit arranged to produce a digital value corresponding to a first area of the photometric output of said exposure information forming circuit on the basis of said first digital signal and a digital value corresponding to a second area of the photometric output of said exposure information forming circuit on the basis of said second digital signal.

BRIEF DESCRIPTION OF THE DRAWINGS

FIG. 7 is a flow diagram showing an operation of CPU for processing the A-D converted values shown in FIG. 6.

FIG. 8 is a circuit diagram showing a modified form of the level-shifting circuit shown in FIG. 1.

DETAILED DESCRIPTION OF THE PREFERRED EMBODIMENTS

Figure 1:
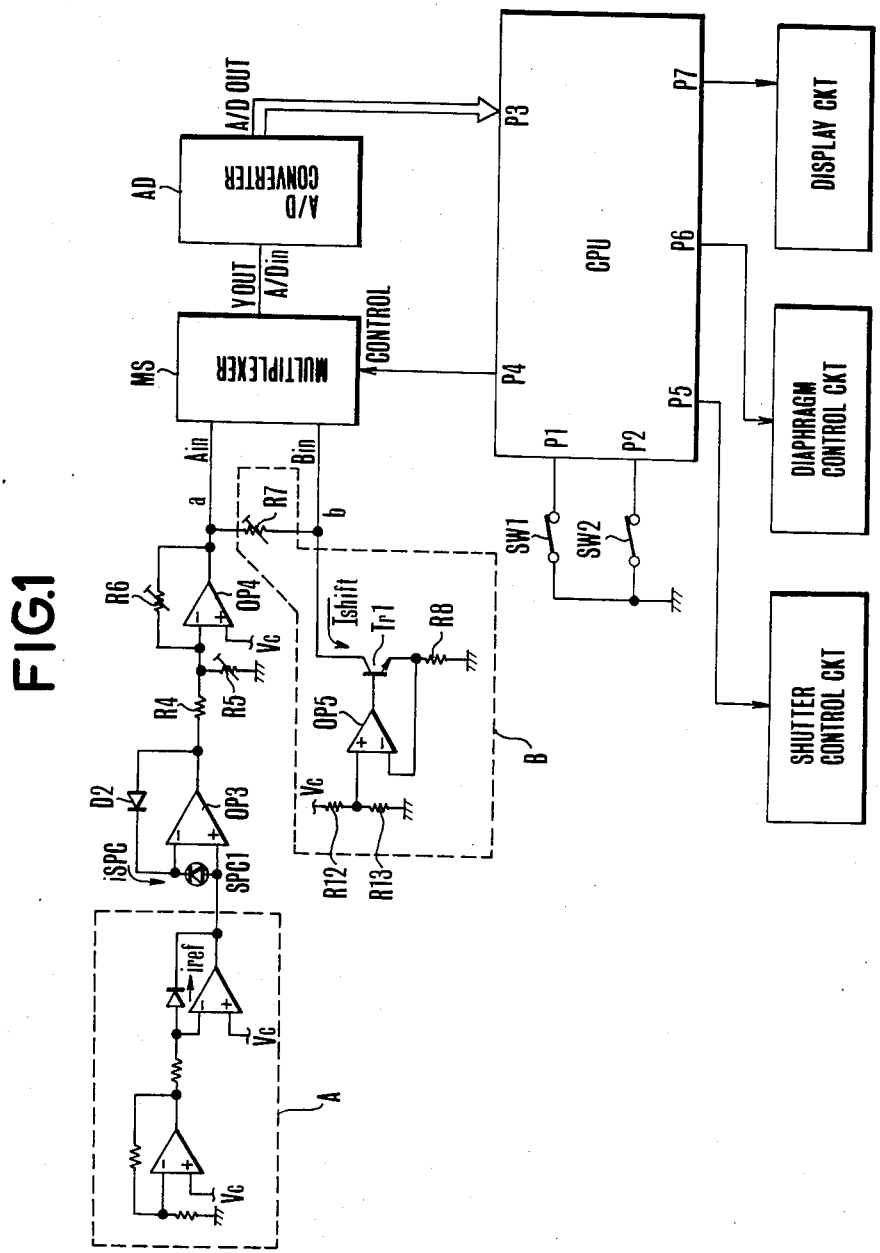
FIG. 1 is a circuit diagram showing an embodiment of a camera which includes a light measuring device according to the present invention.

FIG. 1 is a circuit diagram illustrating a circuit of a camera to which the light measuring circuit according to the present invention is applied.

Referring to FIG. 1, a portion indicated by a broken line (A) shows a temperature compensation circuit, which has been publicly known per se, for effecting temperature compensation of a light measuring amplifier, which will be hereinafter described.

The circuit includes an operational amplifier OP3 having a light receiving element SPC1 connected across its input terminals and a diode D2 connected in its feed-back circuit as a logarithmic compressing element. These elements constitute the abovementioned light measuring amplifier which operates to effect logarithmic compression of a photocurrent iSPC of the light receiving element SPC1. An operational amplifier OP4 is connected to the output of said operational amplifier OP3 through a resistor R4, and a resistor R6 is connected in its feed-back circuit. The operational amplifier OP4 constitutes an inverting amplifier circuit. A portion indicated by a broken line (B) shows a level-shifting circuit which operates to produce an output voltage which is level-shifted by a predetermined amount relatively to the output (a) of the operational amplifier OP4. Said level-shifting circuit includes a constant current circuit formed by resistors R13, R12 and R8, an operational amplifier OP5 and a transistor Tr1. A variable resistor R7 is connected between an output terminal of the operational amplifier OP4 and a collector of said transistor Tr1.

A multiplexer MS having two inputs Ain and Bin is arranged to select the input Ain or Bin, depending on a control signal coming from a central processing unit (hereinafter referred to as CPU), and feed its output signal to an A-D converting circuit AD. The A-D converting circuit is constituted, for example, in the form of a 8-bit sequential comparing type.

The CPU includes an output port P4 for feeding a control signal for controlling said multiplexer, an input port P3 for receiving an output of the A-D converting circuit, an output port P5 for feeding a shutter control signal, an output port P6 for feeding a diaphragm control signal, an output port P7 for feeding a display control signal and input ports P1 and P2 for detecting operations of a light measuring switch and a release switch. The light measuring switch SW1 is arranged to be communicated with a shutter operating member and, for example, it is turned on by a first step of the shutter operation. The release switch SW2 is also arranged to be communicated with the shutter operating member and, for example, it is turned on by a second step of the shutter operation.

Now the operation of the camera as shown in FIG. 1 will be described. Before explaining about the sequential operation of the camera, the description will be given to the A-D conversion for the light measuring device. When the light receiving element SPC1 receives a light from an object to be photographed, for example through a TTL optical system, the light measuring amplifier OP3 produces an output voltage corresponding to an apex value BV, which is inverted by the inverting amplifier OP4 and then fed to the input Ain of the multiplexer MS. On the other hand, owing to the transistor Tr1 which constitutes the constant current circuit, a constant current Ishift passes through the resistor R7. Thus, a potential having a value which is lower than said input voltage Ain by Ishift × R7 is applied to the input Bin of the multiplexer MS.

Figure 2:
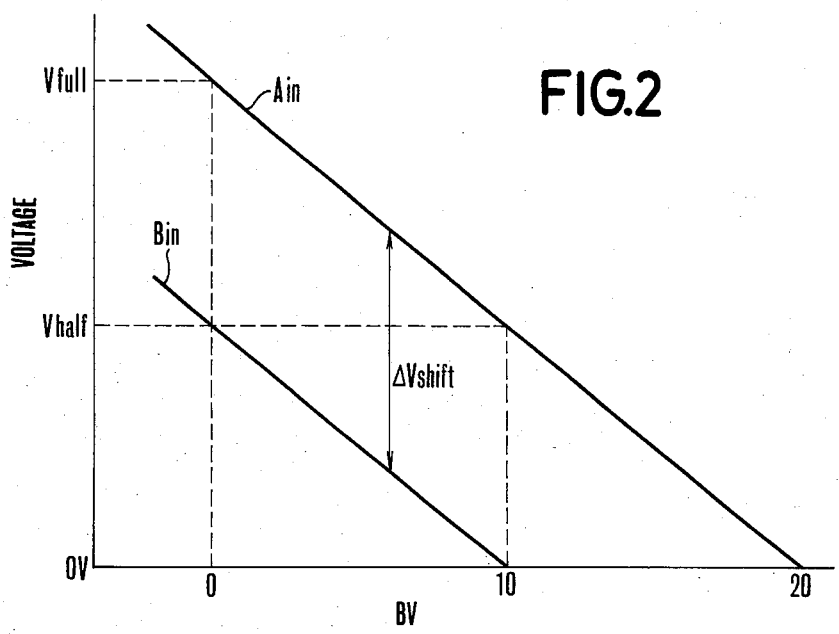
FIG. 2 is a wave form diagram showing wave forms of applied voltages at inputs Ain and Bin of a multiplexer shown in FIG. 1.

FIG. 2 is a wave form diagram showing the relation between the input voltages Ain and Bin of the multiplexer and the BV value. As is clear from FIG. 2, if it is assumed that the input voltage Ain makes a linear change from 0(V) to Vfull (V) within the range of BV0-20, then the input voltage Bin indicates a value which is lower than the voltage Ain by ΔVshift (R7 × Ishift). If said ΔVshift is set as a value corresponding to a half of the voltage Vfull, it is possible to indicate the photometric output within the range from BV0-BV10 by the voltage at the input Bin and to indicate the photometric output within the range from BV10-BV20 by the voltage at the input Ain.

As seen from FIG. 2, at the input Ain the BV20-BV10 is distributed over the full range from the voltage 0(v) to Vhalf=Vfull/2(V), while at the input Bin the BV10 - 0 is distributed over the range from the voltage 0(V) to Vhalf=Vfull/2(V).

If the voltage signals at the inputs Ain and Bin are converted into digital signals, the A/D converted values as indicated by lines A/D OUT(Ain) and A/D OUT(Bin) are obtained.

The A-D converting circuit is of 8-bit type, as described above, and therefore the resolving power is Vhalf/256. If it is assumed that said A-D converting circuit has an error of nLSB, then the reading error of the A-D converting circuit is n×Vhalf/256.

On the other hand, it is possible to directly obtain the photometric information within the range BV0-20 by the output of the light measuring amplifier fed to the input Ain (Ain in FIG. 2). If the photometric output thus obtained is converted by the A-D converting circuit, said converting circuit operates to process the information over the full range from 0(V) to Vfull(V), so that the resolving power is Vfull/256 and the reading error is n×Vfull/256. As compared with the above, in case of the present invention, the reading error is expressed by n×Vhalf/256, as described above, and consequently it is half of the reading error which is produced in case where the photometric information from BV0 to BV20 is obtained by direct A-D conversion of the photometric output of the light measuring amplifier, so that it is possible to obtain the A-D converted value with a higher precision.

Now, the description will be given to the operation of the camera as shown in FIG. 1, in which the A-D conversion system for light measuring device, as described above, is included.

Figure 4A:
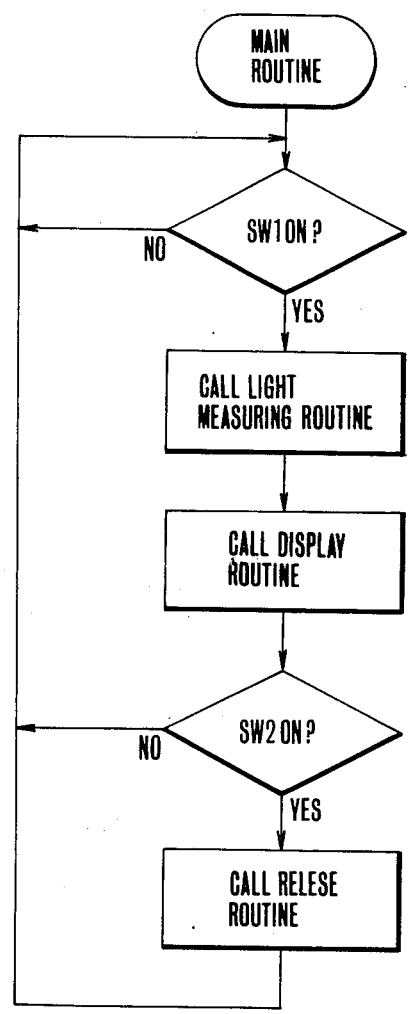
FIGS. 4(a) and 4(b) are flow diagrams showing the operations of the camera shown in FIG. 1.

In FIG. 1, the sequential control is executed in accordance with programs as shown in FIGS. 4(a) and (b) which are contained in a ROM of the CPU. The operation will be explained with reference to these programs.

Figure 3:
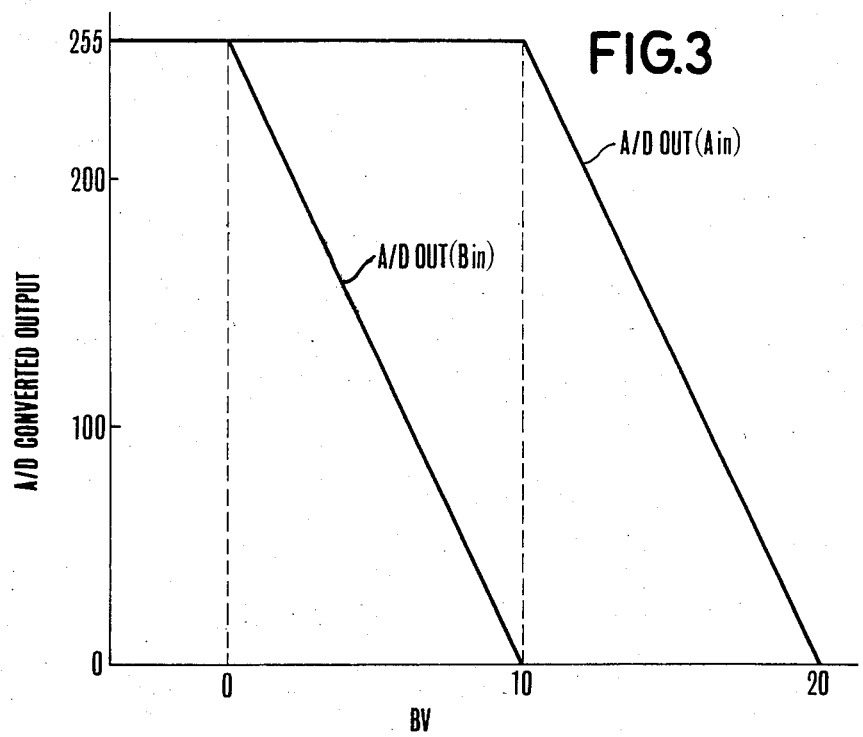
FIG. 3 is a wave form diagram showing wave forms of A-D converted values of the voltages shown in FIG. 2.
Figure 4B:
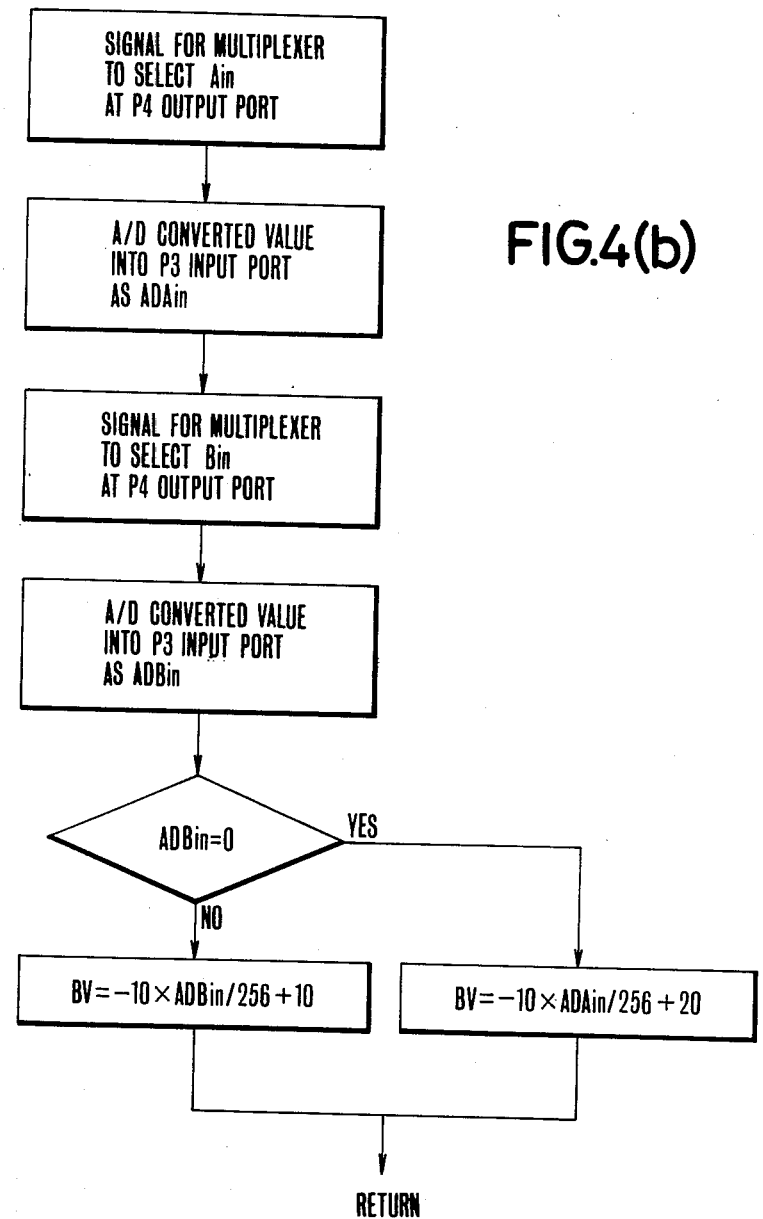

It is now assumed that the release operating member of the camera is operated to its first step, so that the switch SW, is turned on. The CPU detects such first step of the operating member and starts to execute the light measuring routine (FIG. 4(b)). In this routine, the CPU provides a signal for selecting the input Ain at its output port P4 and feeds said signal to the multiplexer MS, which transmits the voltage at the input Ain to the A-D converting circuit AD. The A-D converting circuit AD operates to convert the input signal at the Ain to the value, as shown in FIG. 3, which indicates the digital value relating to BV10-20. The A-D converted value corresponding to the input Ain is fed through the input port P3 of the CPU into an internal register AinR.

Then the multiplexer MS operates to transmit the voltage at the input Bin into the A-D converting circuit under the action of the signal fed from the output port P4 of the CPU. The voltage at the input Bin is a digital value corresponding to BV0-10, as shown in FIG. 3. This didital value is fed through the input port P3 of the CPU into an internal register BinR. When the A-D converted value fed into the register BinR is zero, that is, when the BV is larger than 10, the operation of BV=(−10×ADAin/256)+20 is executed and the BV value is obtained on the basis of the A-D converted value ADAin which has been fed into the register AinR. When the A-D converted value fed into the register BinR is not zero, that is, when the BV is smaller than 10, the BV value is calculated according to the operation of BV=(−10×ADBin/256)+10. After the operation as described above, the routine returns to the main routine. In the main routine, AV value and TV value corresponding to the BV value thus calculated are obtained according to the display routine and the display is effected by the display circuit. At the second step of the releasing operation of the release operating member, the controls of the diaphragm and the shutter time are effected on the basis of the above-mentioned AV value and the TV value.

In the embodiment as described above, the ΔVshift was set as Vfull/256=Vhalf. Now the description will be given to the case where ΔVshift is set as ΔVshift<Vfull/256=Vhalf.

Figure 5:
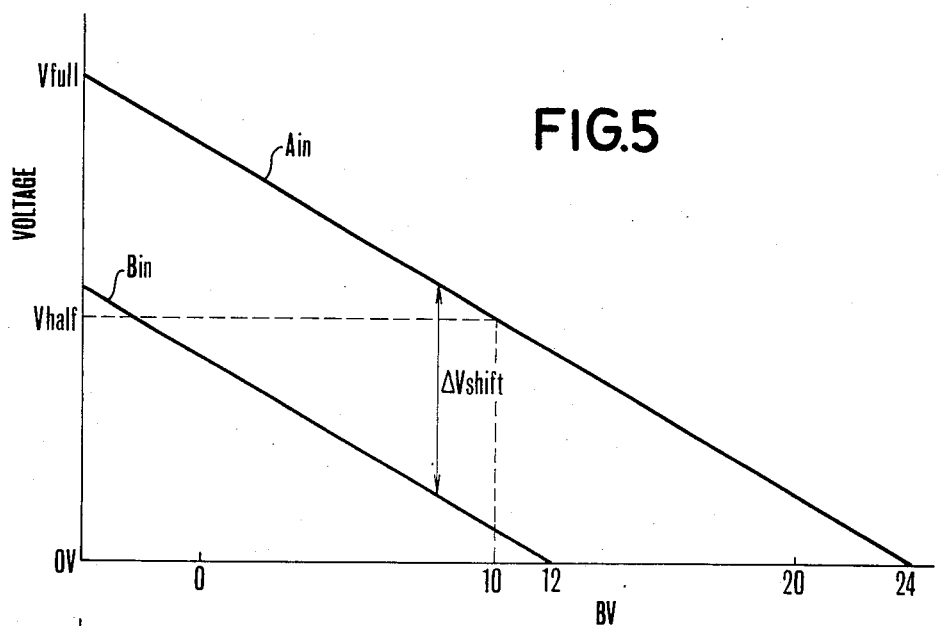
FIG. 5 is a wave form diagram showing wave forms of the other applied voltages at the inputs Ain and Bin of the multiplexer.

Now it is assumed that the photometric output of the light measuring amplifier relative to the range BV0–24 is distributed over the full range from 0(V) to Vfull (V), as shown by a line Ain in FIG. 5. In this case, the level-shifted voltage of the input Bin of the multiplexer M is as shown by a line Bin in FIG. 5.

Figure 6:
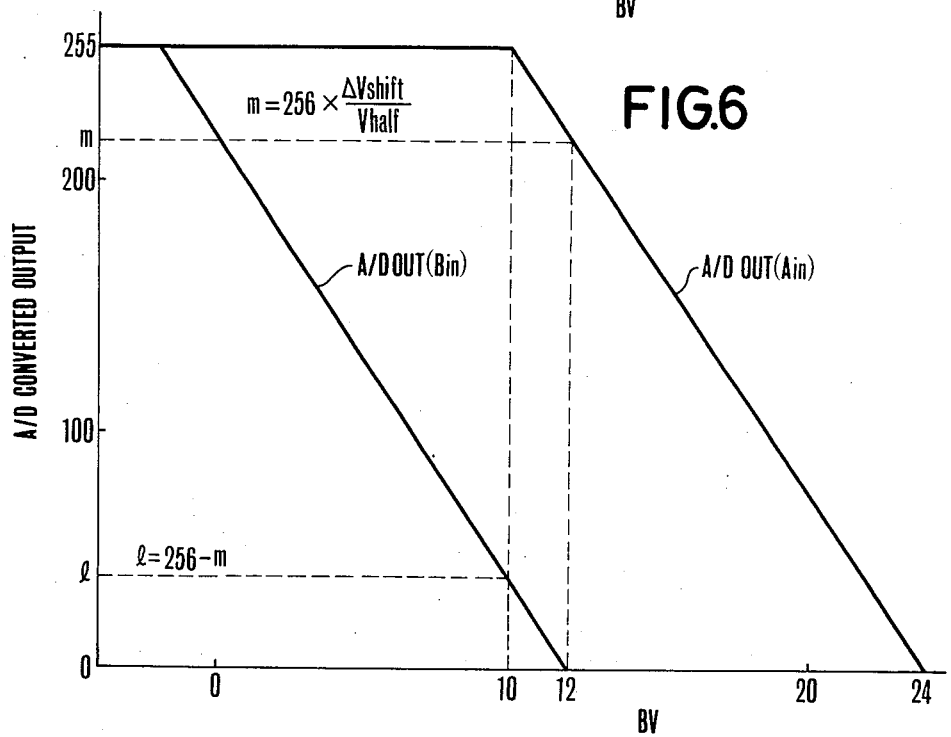
FIG. 6 is a wave form diagram showing wave forms of A-D converted values of the voltages shown in FIG. 5.

When the voltages indicated by the lines Ain and Bin are subjected to the A-D conversion by the A-D converting circuit AD, the outputs indicated by A/D OUT(Ain) and A/D OUT(Bin) in FIG. 6 are produced, in which partly overlapped area of the digital values can be obtained. In this case an error which may be produced in the case where the lines are completely separated as shown in FIG. 3 can be avoided. In other words, in the case as shown in FIG. 3, if the lines are slightly offset from each other, a defect may arise at a border portion between the lines, so that the A-D converted value corresponding to BV at the border portion may be missed, while in the case as shown in FIG. 5, such defect can be avoided by the provision of the overlapping area.

The description will be given to the operation of the A-D conversion where such overlapped area is formed between the A/D OUT(Ain) and the A/D OUT(Bin) relative to the same BV, with reference to a flow diagram shown in FIG. 7.

The voltage fed into the inputs Ain and Bin of the multiplexer MS are transmitted into the A-D conversion registers AinR and BinR, respectively. The A-D converted values ADAin and ADBin corresponding to the voltages Ain and Bin fed into the registers are subjected to a decision as to the following states:

$$ADAin \leqq m, ADBin = 0 \ldots \quad (1)$$

$$ADAin > m, ADBin < 1 \ldots \quad (2)$$

$$ADAin = 255, ADBin \geqq 1 \ldots \quad (3)$$

The case (1) indicates the state where BV≧12. In this case, ADAin is assumed to be X, and the BV value is obtained by the following operation:

$$BV = -14 \times X/256 + 24 \ldots \quad (4)$$

In the case (3), BV≧10. Accordingly, the operation of X=ADBin+m is executed, on the basis of the value of the ADBin and the BV value is obtained by substituting this X value for that in the equation (4). In case of (2), wherein 10<BV<12, an average value of the BV values of the above cases (1) and (3) is obtained, using the values of ADAin and ADBin and said average value is adopted as the BV value of (3). That is, the operation of X=(ADAin+ADBin+m)/2 is effected and the BV value is obtained by substituting said value of X for that in the equation (4).

It will be understood from the above description that according to the present invention the photometric output of the light measuring device is firstly divided into a plurality of areas and then the photometric output section in the respective areas are subjected to the A-D converting operation. Accordingly, the reading error owing to the characteristic LSB error of the A-D converting circuit can be reduced and the correct A-D converted value relative to BV can be obtained. In the device as described above, the level-shifting circuit may be so modified that the inverting amplifier circuit as shown in FIG. 8 is used in place of the circuit indicated by B in FIG. 1 and the output of the operational amplifier OP4 is shifted according to the gain of the amplifier circuit.

What is claimed is:

1. An analog-to-digital converter for converting an analog signal corresponding to an output of an exposure information forming circuit of a camera into a corresponding digital signal, comprising:
    (a) level-shifting means arranged to obtain an analog signal which is level-shifted relatively to the analog signal coming from said exposure information forming circuit by a predetermined amount;
    (b) an analog-to-digital converting circuit arranged to convert the analog signal coming from said exposure information forming circuit and the analog signal level-shifted by said level-shifting means into digital signals, thereby producing a first digital signal corresponding to the analog signal coming from the exposure information forming circuit and a second digital signal corresponding to the analog signal level-shifted by said level-shifting means; and
    (c) a signal processing unit arranged to obtain a digital value corresponding to a first area of the output of said exposure information forming circuit on the basis of said first digital signal and a digital value corresponding to a second area of said output on the basis of said second digital signal.

2. An analog-to-digital converter according to claim 1, wherein said exposure information forming circuit is a light measuring circuit arranged to produce a signal of a luminance of an object to be photographed.

3. An analog-to-digital converter according to claim 1, wherein said level-shifting means is arranged to effect the level shifting by an amount corresponding to a half of a maximum output of said exposure information forming circuit.

4. An analog-to-digital converter according to claim 1, wherein said level-shifting means is arranged to effect the level-shifting by an amount smaller than a half of a maximum output of said exposure information forming circuit.

5. An analog-to-digital converter for converting an analog output signal of a light measuring circuit of a camera, which corresponds to a luminance of an object to be photographed, into a corresponding digital signal, comprising:
    (a) dividing means for dividing the output signal of said light measuring circuit into a plurality of areas relating to the luminance of the object; and
    (b) an analog-to-digital converting circuit arranged to convert the photometric outputs in the respective areas divided by said dividing means into digital signals, respectively, thereby obtaining a digital value corresponding to the luminance in the respective areas.

6. An analog-to-digital converter for converting an analog output signal of a light measuring circuit of a camera, which corresponds to a luminance of an object to be photographed, into a corresponding digital signal, comprising:
 (a) a converting circuit arranged to divide the analog output signal of the light measuring circuit into a plurality of areas relating to the luminance of the object and to convert the photometric outputs of the light measuring circuit in the respective ones of the divided areas relating to the luminance into those having output level falling within a predetermined range;
 (b) an analog-to-digital converting circuit arranged to convert the analog signals converted by the above-mentioned converting circuit into corresponding digital signals; and
 (c) a processing circuit arranged to obtain a digital value corresponding to the luminance on the basis of the digital signals converted by said analog-to-digital circuit.

7. An analog-to-digital converter for converting an analog output signal of a light measuring circuit of a camera, which corresponds to a luminance of an object to be photographed, into a corresponding digital signal, comprising:
 (a) level-shifting means arranged to divide the photometric output of said light measuring circuit into a first area having an output level falling within a predetermined limit and a second area having an output level exceeding said limit and then level-shift the photometric output in said second area;
 (b) an analog-to-digital converting circuit arranged to convert the photometric output within said first area into a corresponding digital signal and to convert the photometric output within the second area, which has been level-shifted by said level-shifting means, into a corresponding digital signal; and
 (c) a processing circuit arranged to obtain a digital value relating to the output in said first or second area, on the basis of the digital signals converted by said analog-to-digital circuit.

* * * * *

UNITED STATES PATENT AND TRADEMARK OFFICE
CERTIFICATE OF CORRECTION

PATENT NO. : 4,702,585

DATED : October 27, 1987

INVENTOR(S) : YOSHIHITO HARADA, ET AL.

Page 1 of 2

It is certified that error appears in the above-identified patent and that said Letters Patent is hereby corrected as shown below:

SHEET 3

In Figure 4a, "CALL RELESE ROUTINE" should read --CALL RELEASE ROUTINE--.

Column 2

Line 59, "abovementioned" should read --above-mentioned--.

Column 3

Line 15, "a" should read --an--.

Column 4

Line 52, "didital" should read --digital--.

UNITED STATES PATENT AND TRADEMARK OFFICE
CERTIFICATE OF CORRECTION

PATENT NO. : 4,702,585

DATED : October 27, 1987

INVENTOR(S) : YOSHIHITO HARADA, ET AL.

Page 2 of 2

It is certified that error appears in the above-identified patent and that said Letters Patent is hereby corrected as shown below:

Column 5

Line 53, "$BV \geqq 10.$" should read --$BV \leqq 10.$--.

Signed and Sealed this

Twenty-fifth Day of October, 1988

Attest:

DONALD J. QUIGG

*Attesting Officer*   Commissioner of Patents and Trademarks